M. W. HOUSE.
Lamp Shade.
No. 112,459.  Patented Mar. 7, 1871.
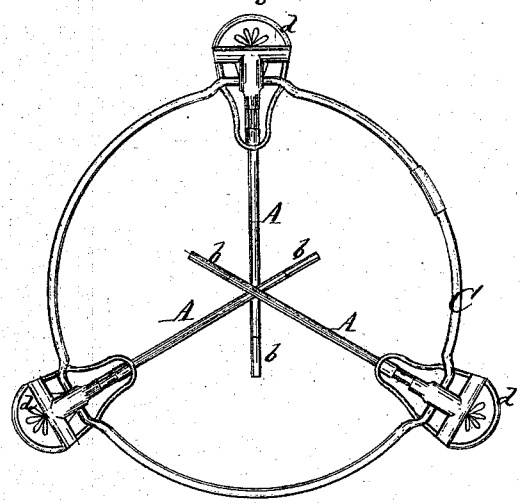
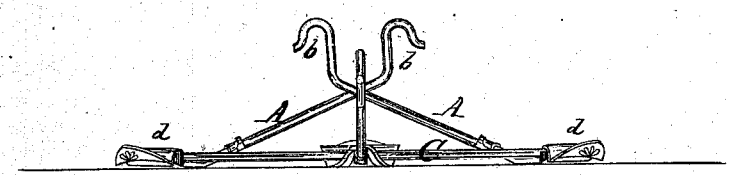
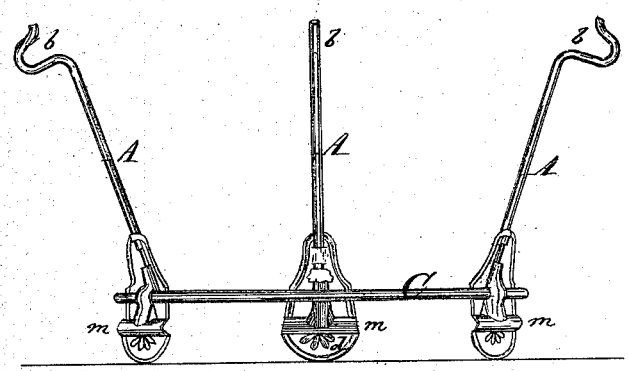

United States Patent Office

MARK WIGGINS HOUSE, OF CLEVELAND, OHIO.

Letters Patent No. 112,459, dated March 7, 1871.

IMPROVEMENT IN SHADE-HOLDERS FOR LAMPS.

The Schedule referred to in these Letters Patent and making part of the same.

*To all whom it may concern:*

Be it known that I, MARK WIGGINS HOUSE, of Cleveland, in the county of Cuyahoga and State of Ohio, have made an invention of a new and useful Shade-holder for Lamps; and that the following is a full, clear, and exact description of the same.

My improved shade-holder consists of a series of hook-ended arms hinged to a ring, which combines the arms together, and fitted at their lower ends with palms to embrace the lamp-font.

In the accompanying drawing—

Figure 1 represents the shade-holder, with its members in the positions occupied by them when the implement is applied to a lamp.

Figure 2 represents the implement with its arms turned inward, for transportation.

Figure 3 represents a plan of the same.

The implement in this instance has three arms, A A A, but this number may be increased.

Each arm is hook-ended at its upper end $b$, to receive the rim of the shade.

Each arm is hinged near its butt to a ring, C, which connects all the arms together.

Each arm, moreover, is fitted at its lower end with a palm, $d$, which is grooved, as at $m$, to embrace the bead or belt usually found at the largest diameter of a lamp-font.

As each arm is hinged to the ring at a point between its end and its palm or butt, the weight of the shape pressing upon the hook end causes the arm to act as a lever, so that its palm embraces the lamp-font with a strong pressure.

When the implement is to be transported the arms may be turned inward, as represented at figs. 2 and 3, so that the implement then occupies but a small space, and may readily be packed inside of the shade it is intended to support.

What I claim as my invention, and desire to secure by Letters Patent, is—

The improved shade-holder, constructed as hereinbefore set forth, with a series of hook-ended arms, hinged to a ring, and fitted at their butt with palms to embrace the lamp-font.

In testimony whereof I have hereto set my hand this 22d day of November, A. D. 1870.

M. W. HOUSE.

Witnesses:
E. C. COOK,
W. L. BENNEM.